Patented Oct. 29, 1929

1,733,458

UNITED STATES PATENT OFFICE

ERWIN HOFFA AND WILHELM LUCE, OF HOCHST-ON-THE-MAIN, GERMANY, ASSIGNORS TO GENERAL ANILINE WORKS, INC., OF NEW YORK, N. Y., A CORPORATION OF DELAWARE

PROCESS OF PRODUCING COMPOUNDS CONTAINING CARBOCYCLIC OR HETEROCYCLIC RINGS

No Drawing. Application filed April 24, 1926, Serial No. 104,456, and in Germany May 5, 1925.

Our present invention relates to the preparation of carbocyclic or heterocyclic bodies.

We have found that fluorosulfonic acid can be used to great advantage for the purpose of closing to a ring the open chains of various classes of aromatic compounds. In condensation reactions which necessitate the use of a condensing agent of an energetic action there were hitherto preferably used fuming sulfuric acid or chlorosulfonic acid. Fluorosulfonic acid offers the advantage over the said condensing agents that in many cases in which the said condensing agents were employed, only small yields were obtained but very good yields when using fluorosulfonic acid; indeed, in certain cases in which no condensation is effected at all by means of chlorosulfonic acid, a satisfactory condensation can be effected by means of fluorosulfonic acid. The valuable technical effect thus obtainable by fluorosulfonic acid is perhaps chiefly due to the fact that the sulfonating action of the fluorosulfonic acid is much less than that of chlorosulfonic acid. In some cases, for instance in the preparation of certain thioindigo dyestuffs from arylthioglycollic acids, it has proved to be advantageous to utilize the oxidizing action of fluorosulfonic acid in order to oxidize the primarily formed oxythionaphthene and thus convert it into the corresponding thioindigo.

The following examples serve to illustrate our invention, the parts being by weight.

1. 50 parts of m-chlorophenylthioglycollic acid are introduced, while stirring, at about 0° C. into 250 parts of fluorosulfonic acid. The resulting mass, which at first shows only a faint yellow color, is allowed to stand for 2 hours while cooling it with ice, which causes it to assume a darker color. The mass is then poured on ice, while stirring, whereupon the chlorooxythionaphthene produced separates in the form of pink-colored lumps. Any unaltered chlorophenylthioglycollic acid which may be present can be easily removed by washing with a diluted solution of sodium carbonate. It is equally advantageous to convert the crude chlorooxythionaphthene by means of the usual oxidizing agents into the corresponding dichlorothioindigo without having to purify it previously; in this case the unaltered chlorophenylthioglycollic acid remains in the mother liquors of the coloring matter, from which it can be easily recovered. The reaction probably takes place according to the equation:

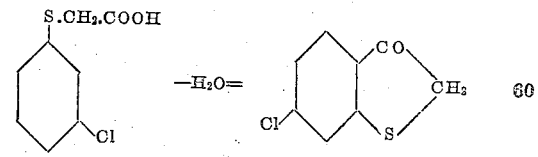

2. 1 part of 1-chloronaphthalene-2-thioglycollic acid is introduced at 15–20° C., while stirring, into 10 parts of fluorosulfonic acid, the resulting solution being of a blue color. The mass is kept for a short time at the said temperature and then poured on 60 parts of ice. The oxythionaphthene precipitates in a slightly colored state and is filtered off and washed. It can be transformed by one of the usual oxidation-processes into the corresponding thioindigo or by condensation with isatine or a derivative thereof into dyestuffs of indirubin structure.

3. 1 part of 1-chloronaphthalene-2-thioglycollic acid is introduced, while stirring, at 20–25° C. into 10 parts of fluorosulfonic acid and kept at this temperature for about 1½ hours. During this operation the solution, which is at first blue, gradually becomes dark greenish-brown. This solution is poured on 60 parts of ice. The dyestuff precipitates and is then purified by washing with water, stirring and heating with slightly alkaline water, filtering and again thoroughly washing it. The dyestuff thus obtained gives on cotton a reddish-blue tint of excellent fastness in every respect.

4. 1 part of 4-aminoanthraquinone-1-anthranilic acid is introduced into 10 parts of fluorosulfonic acid at 0° C. and stirred, while gently heating, until the formation of the ring into the 4-aminoanthraquinone-1.2-acridon is complete. The mass is poured on 50 parts of ice, filtered by suction and washed until it has lost its acidity. The resulting dyestuff is identical with that described in the example of U. S. Patent No. 998,772 of July 25, 1911. The reaction probably takes place according to the equation:

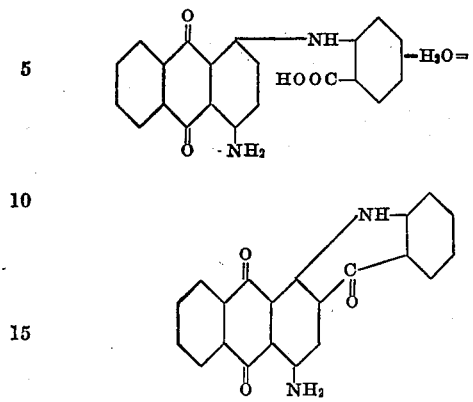

5. 1 part of 2-methoxy-5-chlorophenyl-1-thioglycollic acid is introduced during ½ hour at 25° C. into 10 parts of fluorosulfonic acid. The mixture is allowed to stand for 20 hours at the said temperature and is then poured on ice. Thus the 4.4'-dichloro-7.7'-dimethoxy-bis-2.2'-thionaphtheneindigo separates. In order to assure a satisfactory reaction it is not necessary to use pure fluorosulfonic acid of 100% strength. Indeed, when using fluorosulfonic acid of 90–95% strength, which still contains sulfur trioxide in excess, better yields are obtained because the sulfur trioxide renders inactive the hydrofluoric acid which during the condensation and oxidation processes is set free and unfavorably affects the reaction. The dyestuff forms a violet powder and gives from the vat on the fibre a violet tint. The reaction probably takes place according to the equations:

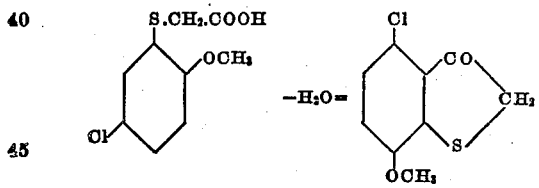

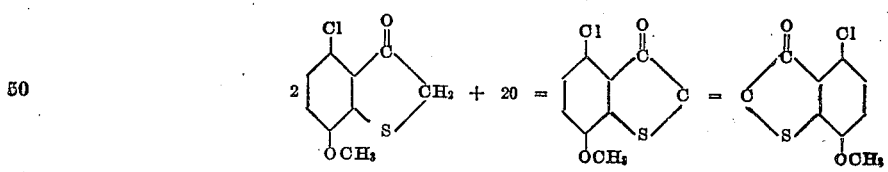

We claim:

1. The process which comprises treating with fluorosulfonic acid a compound containing the atom grouping:

wherein $C_1$ and $C_2$ represent carbon atoms belonging to an aromatic nucleus, X represents a sulfur atom or the imino group, R represents an aliphatic or aromatic radical wherein the carboxyl group is attached to the carbon atom to which X is attached or to a carbon atom adjacent to the carbon atom to which X is attached.

2. The process which comprises treating with fluorosulfonic acid an arylthioglycollic acid.

3. The process which comprises treating with fluorosulfonic acid an arylthioglycollic acid at a temperature of about 0° C. to about 25° C.

4. The process which comprises treating with fluorosulfonic acid 2-methoxy-5-chlorophenyl-1-thioglycollic acid.

5. The process which comprises causing one part of 2-methoxy-5-chloro-phenyl-1-thioglycollic acid to be reacted upon by ten parts of fluorosulfonic acid at a temperature of about 25° C. for about twenty hours.

6. A process of making 4.4'-dichloro-7.7'-dimethoxy-bis-2.2'-thionaphtheneindigo which comprises reacting 2-methoxy-5-chloro-phenyl-1-thioglycollic acid with fluorosulfonic acid until the ring closure and the ensuing oxidation are complete.

In testimony weherof, we affix our signatures.

ERWIN HOFFA.
WILHELM LUCE.